United States Patent [19]

Von Alpen et al.

[11] Patent Number: 5,747,170

[45] Date of Patent: May 5, 1998

[54] BOMBARDMENT-INHIBITING BULLETPROOF GLASS PANE FOR AUTOMOBILES

[75] Inventors: Ulrich Von Alpen, Aachen; M. Gerd Sauer, Stolberg, both of Germany

[73] Assignee: Saint-Gobain Vitrage, Courbevoie, France

[21] Appl. No.: 790,306

[22] Filed: Jan. 28, 1997

Related U.S. Application Data

[63] Continuation of Ser. No. 328,949, Oct. 25, 1994, abandoned.

[30] Foreign Application Priority Data

Oct. 25, 1993 [DE] Germany .................. 43 36 321.0

[51] Int. Cl.[6] .......................... B32B 17/06; G02B 5/08
[52] U.S. Cl. .......................... 428/426; 428/34; 428/432; 428/433; 428/434; 428/699; 428/701; 428/702; 428/911; 89/36.02; 359/353; 359/359; 359/360; 359/885; 296/97.2; 52/786.1
[58] Field of Search .................. 52/786.1; 296/84.1, 296/97.2; 89/36.01, 36.02; 359/359, 360, 356, 353, 885; 428/34, 426, 432, 433, 434, 688, 689, 699, 701, 702, 698, 913, 410, 469

[56] References Cited

U.S. PATENT DOCUMENTS

| | | | |
|---|---|---|---|
| 3,779,733 | 12/1973 | Janakirama-Rao | 65/32.5 |
| 3,978,273 | 8/1976 | Groth | 428/434 |
| 4,716,086 | 12/1987 | Gillery | 428/630 |
| 4,943,484 | 7/1990 | Goodman | 428/441 |
| 5,036,025 | 7/1991 | Lin | 501/48 |
| 5,183,700 | 2/1993 | Austin | 428/216 |
| 5,188,887 | 2/1993 | Linge | 428/216 |
| 5,264,286 | 11/1993 | Ando | 428/432 |
| 5,296,302 | 3/1994 | O'Shaughnessy | 428/472 |
| 5,302,449 | 4/1994 | Eby | 428/336 |
| 5,308,706 | 5/1994 | Kawaguchi | 428/426 |
| 5,496,643 | 3/1996 | Von Alpen | 428/432 |

*Primary Examiner*—Donald Loney
*Attorney, Agent, or Firm*—Oblon, Spivak, McClelland, Maier & Neustadt, P.C.

[57] ABSTRACT

A bombardment-inhibiting bulletproof glass pane for automobiles, composed of a plurality of silicate glass sheets (16, 17, 18, 19), connected together by thermoplastic intermediate layers (20, 21, 22). The pane may also comprise a silicate glass sheet (16) having a high absorption action in the spectral range from 780 to 1,200 nm. This silicate glass sheet (16) or another of the glass sheets (17, 18, 19) constituting the bulletproof glass pane may be provided, on one of its surfaces, with a partially reflecting surface coating (23), which has a high reflection in the spectral range of 780 to 1,200 nm. The bulletproof glass pane has, in total, a total light transmittance of less than 15%, and preferably of less than 10% in the spectral range from 780 to 1,200 nm. Bulletproof glass panes constructed in this manner offer a high security during night travel, because they are non-transparent to infrared sighting devices and noctovisers (night viewing devices).

12 Claims, 3 Drawing Sheets

BOMBARDMENT-INHIBITING BULLETPROOF GLASS PANE FOR AUTOMOBILES

This is a continuation of application Ser. No. 08/328,949, filed Oct. 25, 1994, now abandoned.

BACKGROUND OF THE INVENTION

This invention relates to a bombardment-inhibiting bulletproof glass pane, especially for automobiles.

Bombardment-inhibiting bulletproof glass panes are known in various forms of construction. They usually consist of several silicate glass sheets, which are connected together by thermoplastic intermediate coatings or layers. Depending upon their construction, that is the number and thickness of the individual layers, their bombardment-inhibiting action is more or less pronounced. The bombardment-inhibiting effect can be increased by increasing the total thickness of the bulletproof glass pane and/or by additional incorporation of one or more layers of an impact-resistant polymer, such as polycarbonate and/or by fitting in front a further glass pane with an air gap between, but there are constructional limitations to an increase to the thickness of the bulletproof glass pane as a whole. The bulletproof glass is classified according to German Standard DIN 52290.

Even when the bulletproof glass panes have a comparatively high bombardment-inhibiting action, there exists a considerable interest in preventing the occupants from being seen or recognized from the outside. Opaque curtains are frequently used behind the bulletproof glass panes for this purpose, but this prevents viewing from the inside outwards as well, which as a rule is not desired. The desired effects namely the prevention of looking in from the outside while allowing the facility for looking outwards from the inside, can be achieved by the use of a coating, a sheet or a glass sheet, which possesses a comparatively low transparency in the visible range of the spectrum. A prerequisite for the effectiveness of this measure is that the automobile is not illuminated internally and that the brightness outside the automobile is considerably greater than the brightness inside it.

The known bombardment-inhibiting bulletproof glass panes, even though they prevent viewing from the outside inwards under normal daylight conditions, do not offer any protection against night viewing devices. This means that, for example, during travel at night, marksmen equipped with infrared sighting devices can sight and aim at persons at risk without the person aimed at noticing this. Such infrared aiming devices comprise an infrared emitter, which transmits highly focused infrared light for illuminating the target field, and an infrared converter mounted in a telescopic sight, which converts the reflected infrared light back into visible light.

OBJECTS OF THE INVENTION

The objective of the present invention is the construction of a bulletproof glass pane, especially for an automobile, in such a way that, in addition to its bombardment-inhibiting action, it offers a high degree of safety against night viewing devices, even during night travel.

DESCRIPTION OF THE PREFERRED EMBODIMENTS

Figure 1:
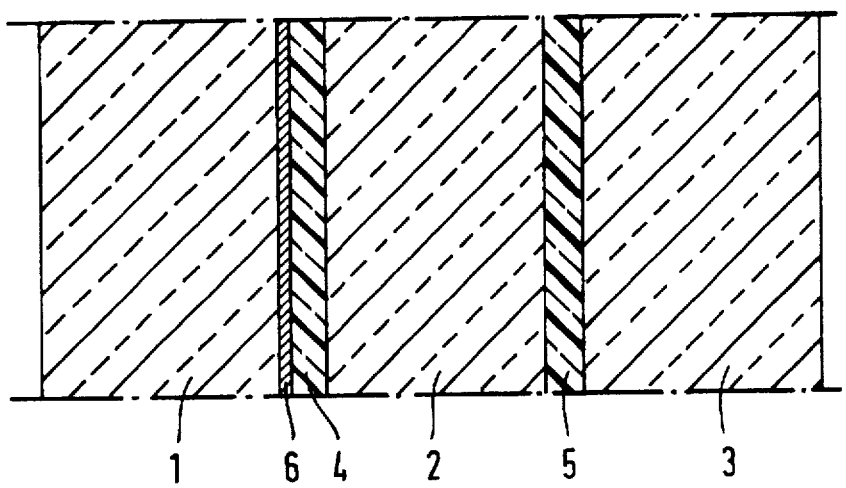
FIG. 1 is a partial sectional view of a bulletproof glass pane comprising a coating that reflects infrared radiation.

The bulletproof glass pane according to this invention is characterized in that it possesses, in the spectral range of 780 to 1,200 nm, a total light transmittance of less than 15% and preferably less than 10%.

Since both the silicate glass sheets commonly used for laminated glass panes and for bulletproof glass panes, and the thermoplastic intermediate layers, normally have a high transmission for infrared rays, the bulletproof glass panes according to this invention are constructed such that at least one layer is provided which possesses the necessary filtering action for the infrared radiation in the spectral range in question. This filtering action can be achieved either by use of a partly transparent surface coating on one of the silicate glass sheets forming the laminated glass pane, or by the use of a silicate glass sheet which itself possesses a low transmission in the aforementioned IR spectral range.

The filtering action of suitable partly transparent surface coatings is based essentially upon the fact that they have a correspondingly high selective reflection in the IR range. In contrast, the filtering action of silicate glass sheets having a special composition is based upon the fact that the infrared radiation in the relevant spectral range is absorbed. Such coatings and glass sheets with selective transparency are known for other applications and are available to the skilled person.

Suitable coatings with selective transparency are, for example, inorganic coatings having the following sequences:

ZnO—Ag—ZnO

ZnO—Ag—ZnO—Ag—ZnO

ZnO—Ag—Zn—ZnO—Ag—Zn—ZnOx

SnO$_2$—ZnO—Zn—Ag—ZnO—Zn—Ag—ZnO

Ti(or TiOx)—ZnS—Ag—ZnS—Ag—ZnS—Ti(or TiOx),

These coatings can be made by reactive cathodic sputtering or by vacuum evaporation. Particularly suitable coatings for the application of the invention are notably a coating having five layers with the following arrangement, ZnO (30 nm)—Ag (10 nm)—ZnO (77 nm)—Ag (10 nm)—ZnO (30 nm); or the neutral color coating with the following arrangement TiOx (1 nm)—ZnS (28 nm)—Ag (10 nm)—ZnS (62 nm)—Ag (12 nm)—ZnS (28 nm)—TiOx (1 nm).

Suitable glass sheets which possess a low transmission in the Infra Red spectral range can be prepared as in European Patent Application 0,452,207 and 0,536,049 corresponding to U.S. Pat. Nos. 5,352,640 and 5,545,596, respectively.

Bulletproof glass panes having the properties according to this invention offer an optimum protection during night travels because they are virtually non-transparent to noctovisers (night viewing devices).

Bulletproof glass panes having the filtering properties according to this invention possess high transparency for visible light. A high transparency for visible light is, for example, necessary when the bulletproof glass panes are used as windscreens or as front side panes. Therefore, these panes do not exhibit any increased safety against viewing from outside into the interior of the vehicle during daylight hours. For the rear side panes and the rear window, however, such minimum requirements with regard to transparency in the range of visible light do not exist. Accordingly, in a further embodiment of this invention, the rear side and rear window panes, which are of much greater importance for the protection of persons at risk who normally occupy the rear part of the automobile, are provided with at least one reflecting or absorbing coating or sheet, which reduces the light transmittance in the visible spectral range to such an extent that viewing from outside into the interior is prevented even in normal daylight, so that the persons at risk cannot be seen or at least cannot be recognized.

Further advantages and details of the invention will be apparent from the claims and from the following description of various examples of embodiment, given with reference to the drawings.

Bulletproof glass panes of the type described here are suitable basically for all the windows of an automobile that is to say both for fixed window panes such as the windscreen and rear window and also for fixed and for height-adjustable side and door window panes. The installation of bulletproof glass panes is carried out in known conventional manner and the details relating to this are therefore not shown in the drawings.

Depending upon the construction of the bulletproof glass pane and in particular where one or more glass sheets or coatings having increased absorption action in the region of visible light are used, the total light transmission in the visible spectral range may lie to a greater or lesser extent below the transmission values required by the relevant regulations for the windscreens and the front side windows, so that in these cases special approvals are necessary. Since for the rear side panes and the rear window pane no regulations exist about minimum transmission values, these window panes that are of special importance for personnel protection can be used without such special approvals.

The bulletproof glass pane illustrated in FIG. 1 comprises three float glass sheets 1, 2 and 3, each 8 mm thick. These three float glass sheets are connected together by the two intermediate sheets 4 and 5 of polyvinyl butyral, each 0.76 mm thick. The float glass sheets and the intermediate sheets can, of course, also have a greater thickness if a higher bombardment-inhibiting action is to be obtained. It is also possible for the bulletproof glass pane to have more than three float glass sheets and/or one or more additional coatings of impact-resistant plastics on the side towards the passenger compartment by which an escape of splinters on this side is prevented in case of bombardment.

The float glass sheet 1 facing towards the outside is provided, on the side bearing against the intermediate film 4, with an IR-reflective surface coating 6. This surface coating 6 is preferably applied by the method of magnetic field-supported, reactive cathodic sputtering and is in particular a multiple coating comprising a thin silver layer as the actual functional layer. For example, this multiple coating 6 comprises a layer of zinc oxide, a silver layer and a further layer of zinc oxide, the thicknesses of these layers being so adjusted that they give the desired reflection properties. The multiple coating 6 favorably comprises a thin covering layer of a different metal oxide, for example tantalum oxide or tin oxide, by which the bond of the multiple layer 6 to the polyvinyl butyral intermediate layer 4 is improved.

Figure 2:
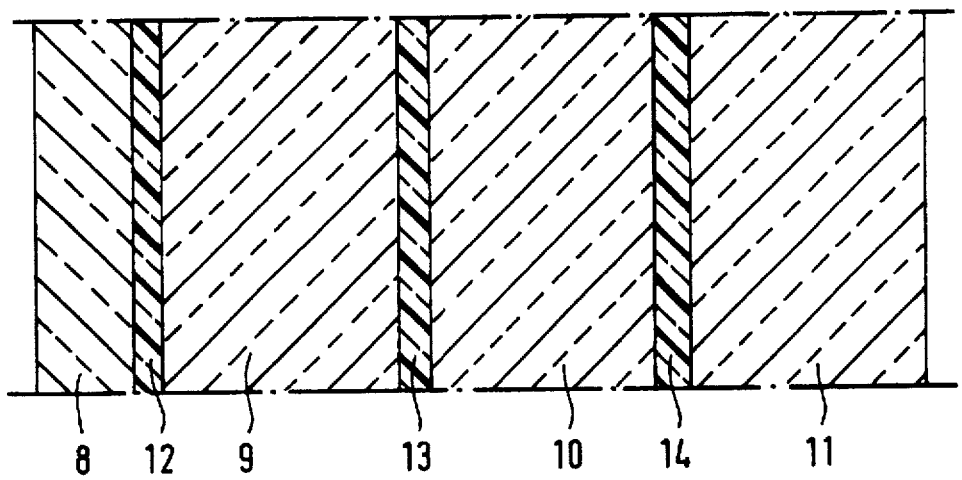
FIG. 2 is a partial sectional view of a bulletproof glass pane comprising a glass sheet that absorbs infrared radiation.

The bulletproof glass pane illustrated in FIG. 2 comprises four single silicate glass sheets 8, 9, 10 and 11, which are each joined to one another by 0.76 mm thick thermoplastic intermediate layers 12, 13 and 14 of polyvinyl butyral. In the case of the glass sheets 9, 10 and 11, these once again are float glass sheets, each 8 mm thick. The silicate glass sheet 8, in contrast, which is disposed on that side of the bulletproof glass pane that is towards the outside, is an infrared radiation-absorbing glass pane, for example 4 mm thick. Silicate glass compositions having suitable absorption properties are known, for example, from European Patent Applications 0 452 207 and 0 536 049. Among these known glass compositions, suitable compositions can be selected according to the absorption and transmission properties desired in the individual cases, taking account of the desired glass sheet thickness.

Figure 3:
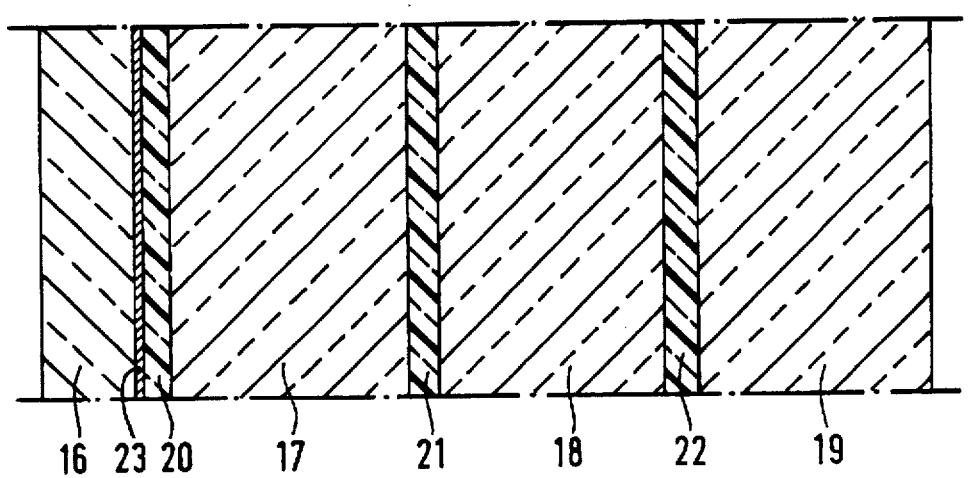
FIG. 3 is a partial sectional view of a bulletproof glass pane comprising a glass sheet that absorbs infrared radiation and an additional, partly-reflecting coating.

One form of construction of a bulletproof glass pane, which comprises both an absorbing silicate glass sheet and also a partly reflecting coating, is illustrated in FIG. 3. In this case the bulletproof glass pane consists of four silicate glass sheets, namely a glass sheet 16 of infrared-absorbing glass, for example 4 mm thick, and three float glass sheets 17, 18 and 19, each 8 mm thick. These four silicate glass sheets are bonded to one another by means of 0.76 mm thick intermediate layers 20, 21 and 22. The glass sheet 16 of infrared radiation-absorbing glass is disposed on the side of the laminated pane facing outwards. To this extent the construction of the bulletproof glass pane corresponds to that of the bulletproof glass pane described in relation to FIG. 2. As a difference, however, from the latter, in this case a multiple layer 23 is additionally disposed on the side of the outer glass sheet 16 bearing against the intermediate layer 20. Multiple layer 23 can have the same construction as the partly reflecting layer 6 already described in relation to FIG. 1. This bulletproof glass pane, which possesses both an absorbing silicate glass sheet and a partly reflecting layer, is especially effective for the intended purpose, because it makes it difficult to look into the vehicle in daylight conditions on one hand and, on the other hand, it has an especially pronounced filtering action in the infrared range, so that it also offers a significant degree of security against night viewing devices.

Figure 4:
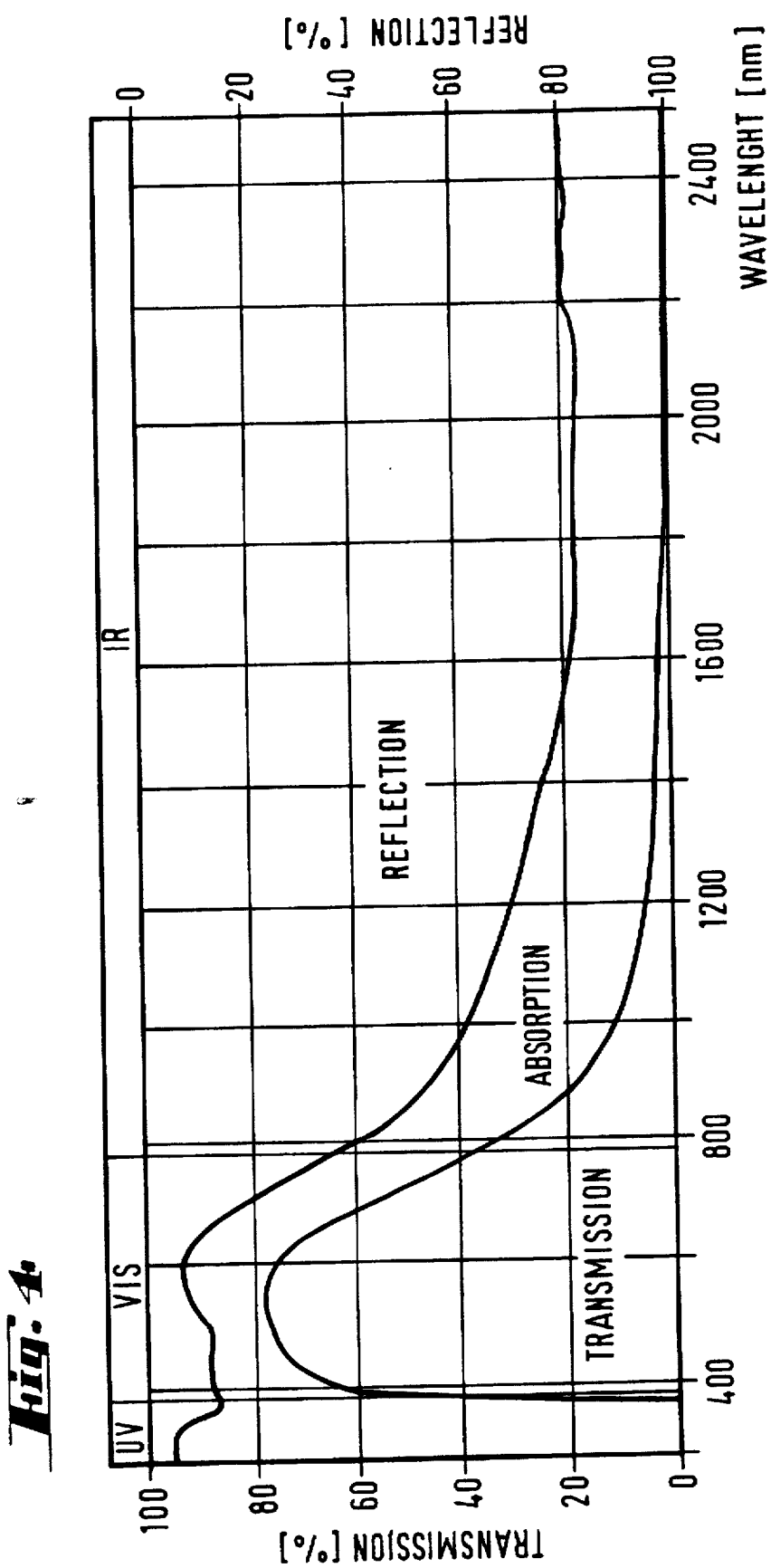
FIG. 4 is a spectral transmission and reflection diagram of a suitable partly reflecting surface coating.

FIG. 4 depicts the spectral, transmission and reflection properties of a partly reflecting layer, which is especially suitable for the objective of this invention. This partly reflecting layer is a multiple layer comprising five layers having the following construction: ZnO (30 nm)—Ag (10 nm)—ZnO (77 nm)—Ag (10 nm)—ZnO (30 nm). The values shown in the diagram were measured on a laminated glass pane consisting of two float glass sheets, each 2 mm thick, and one intermediate layer of polyvinyl butyral, 0.76 mm thick. One of the float glass sheets was provided, on the side bearing against the intermediate layer, with a multiple layer having the above-stated construction. However, the characteristic pattern of the transmission curve and of the reflection curve is determined exclusively by the partly reflecting multiple layer. It can be seen, in particular, that in the visible spectral range the transmission is approximately 70%, whereas in the range of the infrared spectrum in question here, it falls to very low values.

Figure 5:
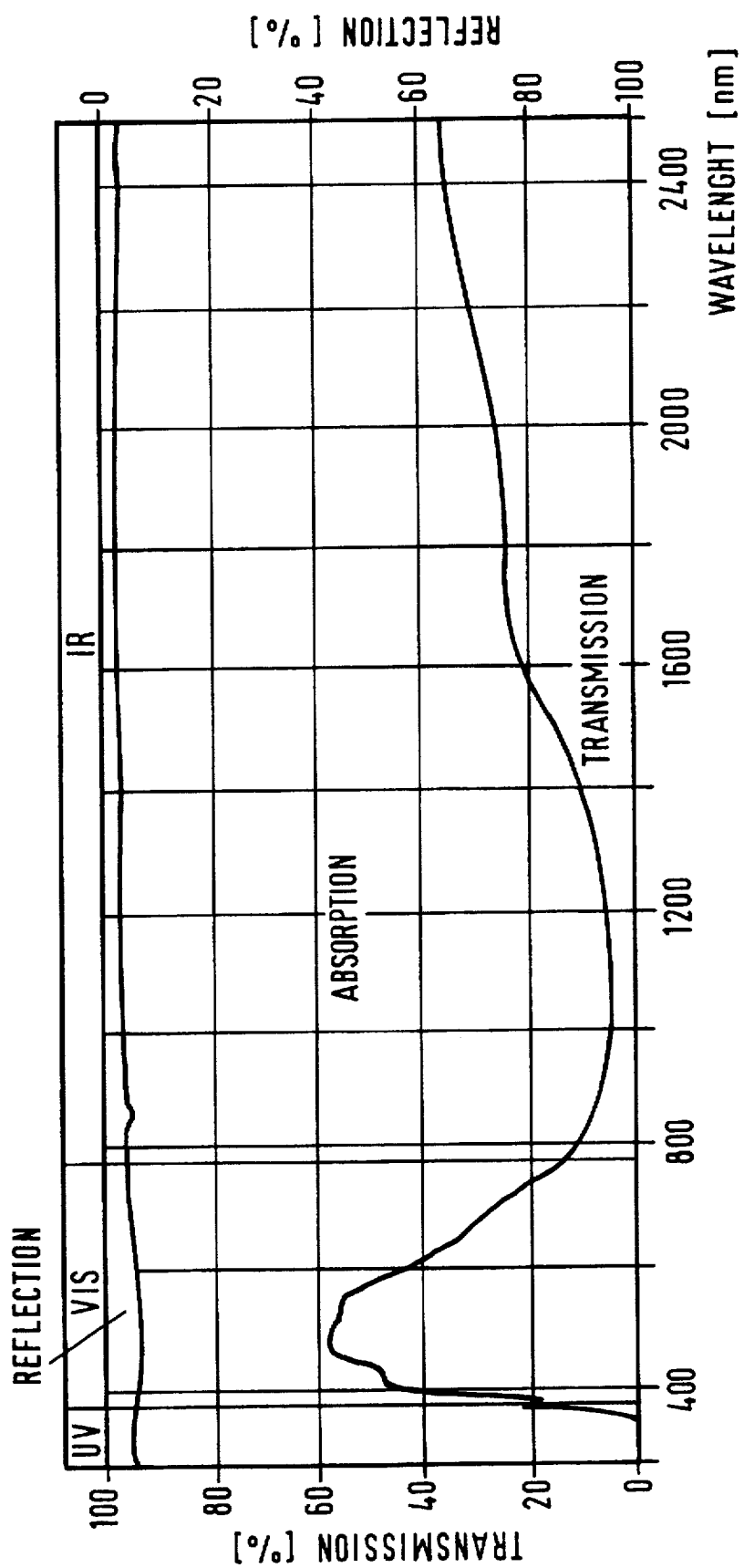
FIG. 5 is a spectral transmission and reflection diagram of a suitable IR-absorbing glass sheet.

The transmission values of a suitable absorbing silicate glass sheet are shown in FIG. 5. These are the readings obtained with a 4 mm thick silicate glass sheet, which has a composition as described in EF 0 536 049, in Examples 6 to 11, which are incorporated herein by reference. In this case also, the glass sheet has a comparatively high transmission of about 50% in the visible spectral ranges whereas the transmission in the part of the infrared (IR) spectral range that is of interest here lies below 10%. It is, of course, possible, by changing the thickness of the glass sheet and/or by slightly modifying the composition of the glass, to obtain somewhat different-transmission curves in an individual case, without thereby changing the basic form of the curve.

It is also within the scope of the invention to arrange the partly reflecting layer and/or the IR-absorbing glass sheet at a different position within the bulletproof glass pane, without thereby altering the essential effect according to this invention. Likewise, within the scope of this invention, the transmission values in the visible spectral range can vary within wide limits according to the particular requirements, without the special protective effect against night viewing devices being thereby adversely affected.

The bulletproof glass panes according to this invention have been described here as automobile panes. Bulletproof glass panes having the construction according to this invention can, however, of course, be used also in railway vehicles or be employed as bombardment-inhibiting bulletproof glass panes for glazing in buildings.

What is claimed as new and desired to be secured by Letters Patent of the United States is:

1. In a bombardment-inhibiting bullet-proof glass pane comprising a laminate of a plurality of sheets of glass suitable as rear side and rear window panes of an automobile, the improvement comprising said pane having a total light transmittance of less than 15% in the infra red spectral range of from 780 to 1,200 and a transmission in the visible spectral range of 70% or less, said pane including an infra red filtering means facing outside of said laminate comprising a silicate glass sheet possessing low transmission in the infra red spectral range, or a partly transparent inorganic surface coating, or a combination thereof.

2. A bombardment-inhibiting bulletproof glass pane according to claim 1, characterized in that the total light transmittance in the spectral range from 780 to 1,200 nm is at most 10%.

3. A bombardment-inhibiting bulletproof glass pane according to claim 1 or 2, comprising a plurality of glass sheets, said pane being characterized in that at least one of the glass sheets constituting the bulletproof glass pane is provided with a surface coating exhibiting a high reflection in the spectral range from 780 to 1,200 nm.

4. A bombardment-inhibiting bulletproof glass pane according to claim 3, characterized in that the surface coating possessing a high reflection in the spectral range from 780 to 1,200 nm, is a multiple coating applied by a vacuum process and comprising at least one thin silver layer as the actual, functional layer.

5. A bombardment-inhibiting bulletproof glass pane according to claim 3, characterized in that the surface coating possessing a high reflection in the spectral range from 780 to 1,200 nm is disposed on the inwardly facing surface of the outermost glass sheet.

6. A bombardment-inhibiting bulletproof glass pane according to one of claims 1, characterized in that at least one of the glass sheets constituting the bulletproof glass pane consists of a glass sheet possessing a high absorption in the spectral range from 780 to 1,200 nm.

7. A bombardment-inhibiting bulletproof glass pane according to one of claims 1, characterized in that the bulletproof glass pane is provided, on its face towards the passenger compartment, with one or more polymer coatings preventing the release of splinters in the case of bombardment.

8. A bombardment-inhibiting bulletproof glass pane according to one of claims 1, characterized in that, on the side of the bulletproof glass pane facing outwards, a further glass pane is disposed in front of the laminated glass pane with an air gap between.

9. A bombardment-inhibiting bulletproof glass pane according to claim 3, characterized in that the surface coating comprises multiple layers of inorganic substances and has the following arrangement: ZnO—Ag—ZnO—Ag—ZnO.

10. A bombardment-inhibiting bulletproof glass pane according to claim 3, characterized in that the surface coating comprises multiple layers of inorganic substances and has the following arrangement: Ti (or TiOx)—ZnS—Ag—ZnS—Ag—ZnS—Ti (or TiOx).

11. A bombardment-inhibiting bulletproof glass pane according to claim 1, comprising a plurality of bulletproof glass sheets having thermoplastic intermediate layers therebetween, said glass pane exhibiting a total light transmittance, in the spectral range of 780 to 1,200 nm, of less than 15%.

12. A bombardment-inhibiting bulletproof glass pane according to claim 1, wherein the surface coating comprises multiple layers of the following inorganic substances:

Zn—Ag—ZnO,

ZnO—Ag—ZnO—Ag—ZnO,

ZnO—Ag—Zn—ZnO—Ag—Zn—ZnO$_x$,

SnO$_2$—ZnO—Zn—Ag—ZnO—Zn—Ag—ZnO, or

Ti(TiOx)—ZnS—Ag—ZnS—Ag—ZnS—Ti(TiO$_x$).

* * * * *